(12) United States Patent
Ayala

(10) Patent No.: US 6,424,961 B1
(45) Date of Patent: *Jul. 23, 2002

(54) ADAPTIVE NEURAL LEARNING SYSTEM

(76) Inventor: Francisco José Ayala, 1095 Natoma #8, San Francisco, CA (US) 94103

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/455,251

(22) Filed: Dec. 6, 1999

(51) Int. Cl.$^7$ .............................................. G06F 15/18
(52) U.S. Cl. ......................................... 706/25; 706/16
(58) Field of Search ..................... 706/25, 16

(56) References Cited

U.S. PATENT DOCUMENTS

| 4,994,982 | A | | 2/1991 | Duranton et al. .............. 706/41 |
| 5,093,899 | A | * | 3/1992 | Hiraiwa ........................ 706/25 |
| 5,140,530 | A | | 8/1992 | Guha et al. .................... 706/19 |
| 5,249,259 | A | | 9/1993 | Harvey ......................... 706/13 |
| 5,283,855 | A | | 2/1994 | Motomura et al. ............. 706/25 |
| 5,349,646 | A | * | 9/1994 | Furuta et al. .................. 706/21 |
| 5,402,522 | A | | 3/1995 | Alkon et al. ................... 706/26 |
| 5,428,710 | A | | 6/1995 | Toomariam et al. .......... 706/25 |
| 5,452,402 | A | | 9/1995 | Sakiyama et al. ............. 706/31 |
| 5,455,891 | A | | 10/1995 | Hirotsu et al. ................. 706/25 |
| 5,459,817 | A | | 10/1995 | Shima .......................... 706/25 |
| 5,515,477 | A | | 5/1996 | Sutherland .................... 706/41 |
| 5,566,273 | A | | 10/1996 | Huang et al. .................. 706/25 |
| 5,617,483 | A | | 4/1997 | Osawa ......................... 382/159 |
| 5,640,494 | A | | 6/1997 | Jabri et al. ..................... 706/25 |
| 5,704,016 | A | | 12/1997 | Shigematsu et al. ........... 706/41 |
| 5,717,832 | A | * | 2/1998 | Steimle et al. ................ 706/33 |
| 5,729,662 | A | | 3/1998 | Rozmus ....................... 706/20 |
| 5,832,466 | A | | 11/1998 | Feldgajer ..................... 706/13 |
| 5,835,901 | A | | 11/1998 | Duvoisin, III et al. ........ 706/13 |
| 5,870,728 | A | | 2/1999 | Yatsuzuka et al. ............. 706/25 |
| 5,920,851 | A | | 7/1999 | Muller ......................... 706/20 |
| 5,930,781 | A | | 7/1999 | Toomarian et al. ........... 706/25 |
| 5,937,432 | A | | 8/1999 | Yamaguchi et al. .......... 711/154 |
| 6,205,556 | B1 | * | 3/2001 | Watanabe et al. ........... 713/330 |
| 6,269,351 | B1 | * | 7/2001 | Black ........................... 706/15 |

OTHER PUBLICATIONS

Wasserman et al, "Neural Networks, Part 2:" IEEE Expert, 1988.*
Scalero et al. "A Fast New Algorithm for Training Feedforward, Neural Networks", IEEE Transactions on Signal Processing, Jan. 1992.*

* cited by examiner

Primary Examiner—George B. Davis
(74) Attorney, Agent, or Firm—Ditthavong & Carlson, P.C.

(57) ABSTRACT

An adaptive integration network includes a plurality of interconnected neurons that are configured to fire when their excitation level, which is responsive to weighted input signals, is greater than or equal to a threshold. When two neurons fire in close temporal proximity, the weight of the connection is strengthened. Adaptive learning is induced by increasing the activity of the adaptive integration network, such as by lowering the threshold level.

30 Claims, 9 Drawing Sheets

ADAPTIVE NEURAL LEARNING SYSTEM

FIELD OF THE INVENTION

The present invention relates to artificial intelligence and more particularly to artificial neural networks.

BACKGROUND OF THE INVENTION

Artificial intelligence is the study and design of computer systems to exhibit characteristics associated with intelligence, such as language comprehension, problem solving, pattern recognition, learning, and reasoning from incomplete or uncertain information. Since the human brain is an intelligent organ, many researchers have been attempting to achieve artificial intelligence by modeling computer systems after the human brain with artificial neural network technology. Although computer scientists have been studying artificial neural network models for years and have achieve some modest successes, the full potential of artificial neural networks remains unrealized because of inherent limitations in current implementations.

An artificial neural network comprises a group of interconnected processing nodes referred to as neurons. FIG. 10A depicts a neuron 1012 in typical artificial neural network implementations, which receives a number of input signals (e.g. X1, X2, and X3) through weighted connections (W1, W2, and W3), processes the weighted input signals in accordance with an activation function (F), and produces an output signal Y in response. The input signals Xi are the data supplied by user or output signals from other neurons within the network. Each input signal Xi is multiplied by the corresponding connection weight Wi, and the output signal Y is typically the result of applying the activation function F to the sum of the weighted input signals, e.g. $Y=F(\Sigma X_i W_i)$.

In most implementations, neurons are arranged in a network of two or more layers: an input layer, an output layer, and zero or more hidden layers between the input layer and the output layer. Referring to FIG. 10B, an exemplary artificial neural network 1000 comprises an input layer of neurons 1002, 1004, and 1006, a hidden layer of neurons 1012, 1014, 1016, and 1018, and an output layer of neurons 1022 and 1024.

In the illustrated example, adjacent layers are fully interconnected, and signal processing is "feedforward" in which each neuron within a given layer receives input signals from every neuron in the previous layer and transmits an output signal to every neuron in the next layer. For example, neuron 1012 in the hidden layer receives input signals from all three input layer neurons 1002, 1004, and 1006 and transmits an output signal to both output layer neurons 1022 and 1024. Accordingly, data input vectors [INPUT 1, INPUT 2, INPUT 3], equal in size to the number of neurons in the input layer, are presented to the input layer and are processed in turn by the successive hidden layers (if any) and finally the output layer. The resulting output vector [OUTPUT 1, OUTPUT 2], equal in size to the number of neurons in the output layer, is the data output of the artificial neural network.

Training an artificial neural network refers to the process of setting the connection weights so that the artificial neural network produces a desired output in response to particular inputs. Typically, the operation of the artificial neural network is divided into a training phase and an implementation phase, and the artificial neural network is not ready for use until the training is complete. Although many training techniques have been proposed, they generally fall into one of two types: supervised learning or unsupervised learning. These techniques are typically applied after the connection weights of the artificial neural network have been initialized to pseudorandom values.

With supervised learning, sets of training pairs (data input vectors and their corresponding desired output vectors) are presented to the artificial neural network for processing. When the artificial neural network produces an output vector in response, the output vector is compared with the input vector to calculate one or more error signals. These error signals are fed back into an algorithm that determines how each weight should be adjusted. Two common algorithms include backpropagation (e.g. U.S. Pat. Nos. 5,283,855, 5,566,273, and 5,870,728) and genetic algorithms (e.g. U.S. Pat. Nos. 5,140,530, 5,249,259, and 5,832,466). Other approaches have been suggested, such as U.S. Pat. No. 5,640,494 wherein individual connection weight values are perturbed, with the perturbation being rejected or retained based on whether the perturbation improves the output.

Unsupervised learning does not require feedback because input vectors do not have a priori associated output vectors. Instead, the input vectors are chosen to represent fundamental patterns, and the connections of the artificial neural network are adjusted so that the output vector represents a classification value, wherein similar future input vectors will produce the same classification value as output. U.S. Pat. Nos. 5,617,483, 5,729,662, and 5,835,901, for example, disclose various modifications of unsupervised learning.

These conventional types of artificial neural networks have fallen far short of the goal of endowing a machine with recognizable intelligence. Conventional artificial neural networks are essentially statistical correlation algorithms, relying on elaborate mathematical manipulations in their training and data processing phases. As a result, conventional artificial neural networks are basically limited to prepackaged pattern recognition applications.

For example, conventional artificial neural networks do not learn from experience, because they have distinct training and implementation phases. Weights are only modified during the training phase, but the operation of the artificial neural network occurs only in the implementation phase, during which no training is allowed and the artificial neural network is frozen at a current level of competence.

Conventional artificial neural networks are also inefficient in learning new things, when subjected to a retraining phase. Whenever a new training pair is to be learned, all of the prior training sets have to be relearned too in order not to lose previously stored capabilities. In addition, convention artificial neural network models lack a mechanism for easily modifying only relevant neurons or for shielding some neurons from further modification, because changes are either made to the entire artificial neural network or random changes are imposed indiscriminately throughout the artificial neural network.

SUMMARY OF THE INVENTION

There is a long-felt need for an artificial neural network that is more brain-like in architecture and operation so that the artificial neural network is capable of learning from experience.

These and other needs are addressed by an adaptive integration network, in which learning occurs during the normal operation of the adaptive integration network, and adaptive learning is promoted by increasing the activity level of the adaptive integration network.

In accordance with one aspect of the present invention, an adaptive integration network includes a plurality of interconnected neurons that are configured to fire when their excitation level, which is responsive to weighted input signals, is greater than or equal to a threshold. When a "presynaptic" neuron fires, transmits a signal to a "postsynaptic" neuron, and causes the postsynaptic neuron also to fire in close temporal proximity, the weight of the connection is strengthened, so that learning occurs during normal operation. In one embodiment, a connection weight strengthening function is employed that asymptotically converges to a line $|w'|=|w|$, so that higher weights are increased in their absolute values by smaller increments.

According to another aspect of the present invention, the adaptive integration network is further trained by increasing the network activity, which causes the adaptive integration network to explore other possible connection weights, until the adaptive integration network produces the desired output. Various techniques may be employed to temporarily increase the network activity, for example, by lowering the thresholds, scaling the connection weights by a positive factor, or increasing the magnitude of the neural signals or of selected external input signals.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for adaptive integration networks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

NEURONS

Figure 1:
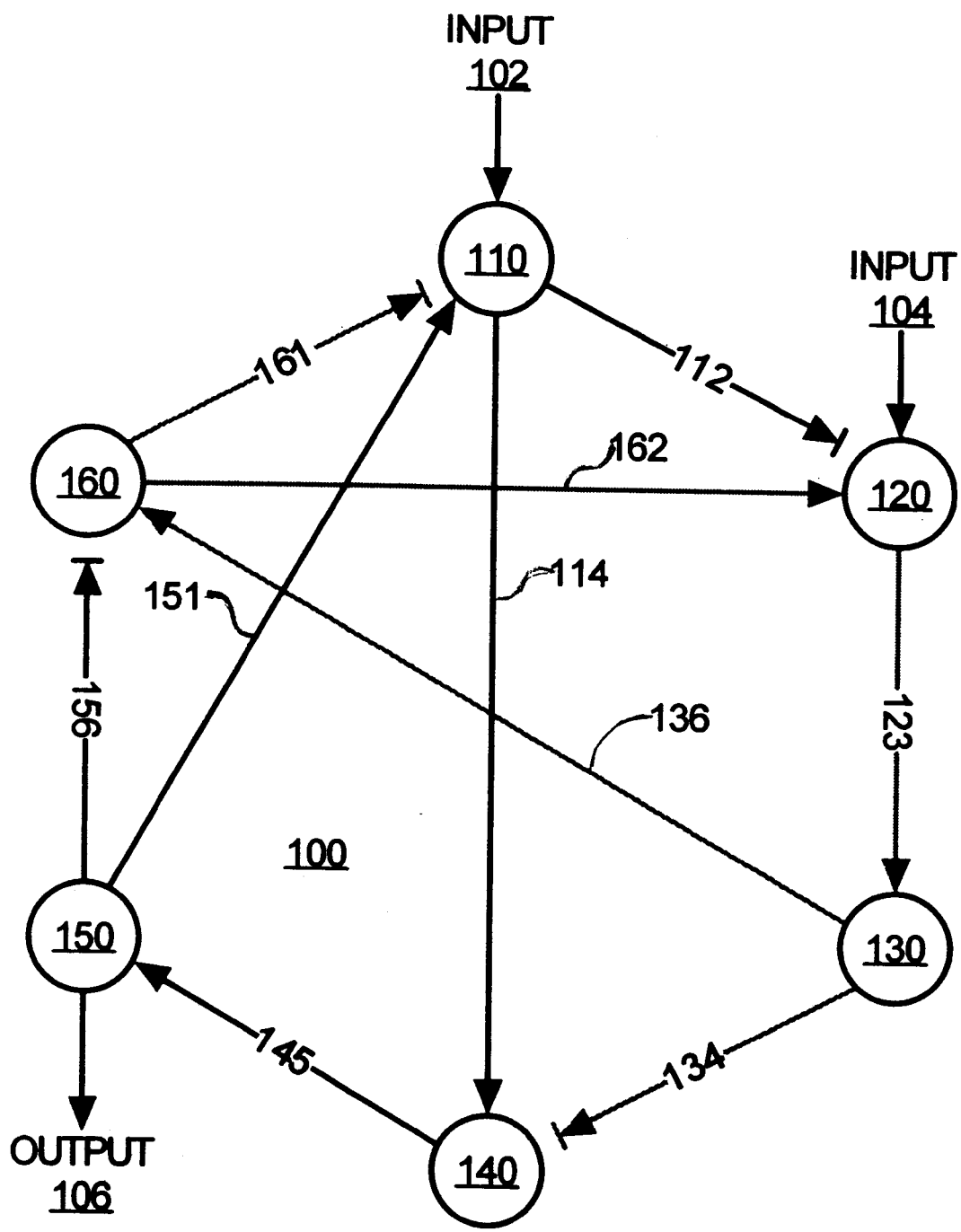
FIG. 1 is a schematic drawing of an adaptive integration network with mutually competitive loops in accordance with one embodiment of the present invention.

FIG. 1 is a schematic drawing of one example of an adaptive integration network 100, comprising six interconnected processing elements, referred to as "neurons" 110, 120, 130, 140, 150, and 160. Although the adaptive integration network 100 is illustrated as containing six neurons on a two-dimensional plane, it is to be understood that the present invention is not limited to the particular number of the neurons nor to any particular network topology. In fact, implementations of an adaptive integration network may comprise hundreds, thousands, even millions of interconnected neurons. Neurons may be arranged in various physical and logical configurations, including but not limited to hexagonal, circular, rectangular, toroidal structures in one, two, three, or higher dimensions.

A neuron is the basic processing element of an adaptive integration network and is configured to receive signals from its "presynaptic" neurons as input and, in response, transmit output signals to its "postsynaptic" neurons. A neuron has two output states, firing or non-firing. In one embodiment, binary output signal values of $x_i=1$ and $x_i=0$ are assigned for the firing and non-firing states, some embodiments may employ non-binary values for the output signal $x_i$, for example, within a range $0.0 \leq x_i \leq 1.0$. As another example, the value of the output signal $x_i$ is 0.0 if the neuron is not firing, and greater than or equal to 1.0 if the neuron is firing as explained in more detail herein after. When a neuron fires, that neuron could potentially cause its postsynaptic neurons to fire, as more specifically explained herein after, which could cause their postsynaptic neurons to fire, and so on, setting up a chain reaction along an active pathway.

Any neuron in an adaptive integration network can be designated as a data input neuron or a data output neuron. A data input neuron is a neuron that receives a signal external to the adaptive integration network, and a data output neuron is a neuron whose output signal is transmitted to a destination external to the adaptive integration network. Accordingly, external signals input into data input neurons may initiate a chain reaction of neuron firings throughout the adaptive integration network. When the neuron firings eventually affect the state of the data output neurons, the output of the adaptive. integration network will change in response.

In the example of FIG. 1, neurons 110 and 120 are data input neurons because neurons 110 and 120 receive external input signals 102 and 104, respectively. Neuron 150 is a data output neuron because neuron 150, when firing, produces an output signal 106. In this configuration, an asserted input signal 102 eventually causes neuron 110 to fire, which may then cause neuron 140 and then neuron 150 to fire, thereby producing the output signal 106. Thus, the adaptive integration network 100 produces an output signal 106 in response to an input signal 102. In many implementations, it is convenient for data input neurons to only receive a single external signal and no internal signals as input.

CONNECTIONS

A connection is the conduit along which a neuron receives a signal from another neuron. Connections can be formed between neurons in any direction to transmit a signal from an output of a presynaptic neuron to an input of a postsynaptic neuron. Typically, a neuron plays both roles, first as a postsynaptic neuron for receiving input signals from its presynaptic neurons, and second as a presynaptic neuron for generating output signals to its postsynaptic neurons. For example, with continued reference to FIG. 1, presynaptic neuron 110 is coupled to postsynaptic neuron 140 by connection 114, thus neuron 110 is configured to transmit information to neuron 140. In FIG. 1, neuron 110 is also coupled to neuron 120 by connection 112; neuron 120 is coupled to neuron 130 by connection 123; neuron 130 is coupled to neuron 140 by connection 134 and to neuron 160 by connection 136; neuron 140 is coupled to neuron 150 by connection 145; neuron 150 is coupled to neuron 110 by connection 151 and to neuron 160 by connection 156; and neuron 160 is coupled to neuron 110 by connection 161 and to neuron 120 by connection 162.

Connections may be excitatory or inhibitory, through which transmitted signals respectively promote or retard the firing of the postsynaptic neuron in response. With continued reference to FIG. 1, excitatory connections are represented by a fully connected arrow, and inhibitory connections are illustrated with an offset, blocked arrow. For example, connections 114, 123, 136, 145, 151, and 162 are excitatory, and connections 112, 134, 156, and 161 are inhibitory. Excitatory connections are used to transmit signals from one neuron to another in a feedback loop or other active pathway. Inhibitory connections, on the other hand, prevent neurons from firing and are useful in providing internal regulation among feedback loops, but cannot actually form a connection in a feedback loop.

An adaptive integration network may be configured to include feedback loops. A loop is a closed circuit of linked excitatory connections arranged in the same circular direction. For example, adaptive integration network 100 comprises two loops, a first loop with neurons 110, 140, and 150 indicated with black excitatory connections 114, 145, and 151, and a second loop with neurons 120, 130, and 160 denoted with gray excitatory connections 123, 136, and 162.

Loops are highly interactive with other loops. In general, a loop can be mutually reinforcing or mutually competitive with one or more other loops. The adaptive integration network 100 depicted in FIG. 1 illustrates an example with two mutually competitive loops. If an input signal 110 is applied causing neuron 110 to fire in the first (black) loop, then a chain reaction is set up wherein neuron 140 fires, then neuron 150 fires, then neuron 110 fires again, and so forth. In addition, neurons 110 and 150 have inhibitory connections 112 and 156, respectively for suppressing firings of neurons 120 and 160, respectively, in the second (gray) loop. Thus, activation of the first (black) loop can force the deactivation of the second (gray) loop. Similarly, activating the second (gray) loop builds a circular chain of firings through neurons 120, 130, and 160, while suppressing activity in neurons 110 and 140, via inhibitory connections 161 and 134, respectively.

Figure 2:
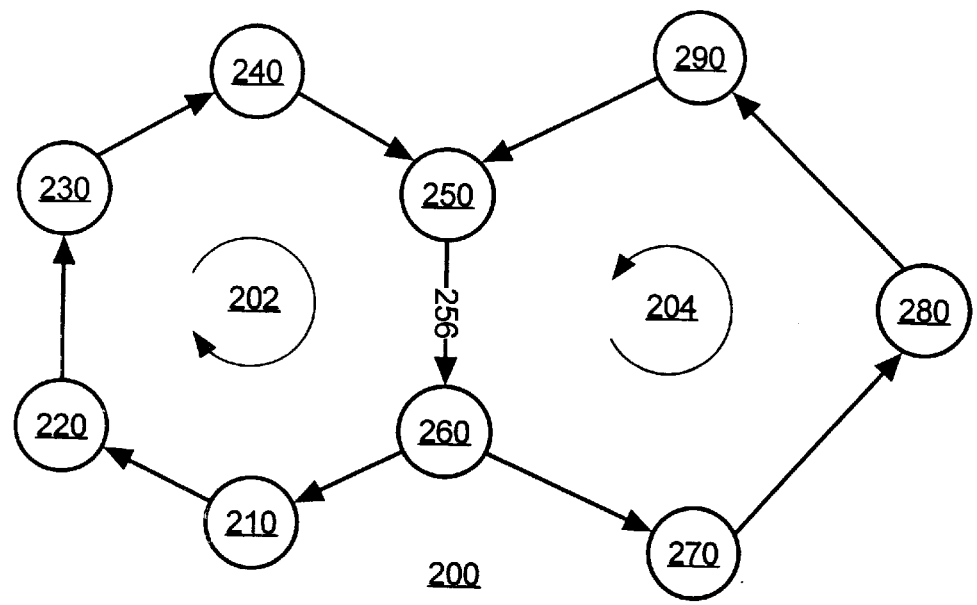
FIG. 2 is a schematic drawing of an adaptive integration network with mutually interacting loops that share a connection in accordance with one embodiment of the present invention.

Mutually interacting loops may be aggregated to form metaloops at a higher level of integration. For example, two mutually interacting loops may share one or more connections in common such that activity in one loop will affect the activity in the other loop. Referring to FIG. 2, depicted is a portion of an adaptive integration network 200 with two mutually interacting loops 202 and 204. Loop 202 comprises six neurons 210, 220, 230, 240, 250, and 260 connected in sequence, and loop 204 comprises five neurons 250, 260, 270, 280, and 290 connected in sequence. Both loops 202 and 204 share neurons 250 and 260, which are coupled by connection 256. Activity on either loop influences activity on the other loop. For example, if neuron 210 in loop 202 fires, that firing eventually results in the firing of neuron 260, which transmits a signal to neuron 210 of loop 202 and to neuron 270 of loop 204. Similarly, if neuron 270 in loop 204 fires, that firing eventually results in the firing of neuron 260, which transmits a signal to neuron 210 of loop 202 and to neuron 270 of loop 204.

Figure 3:
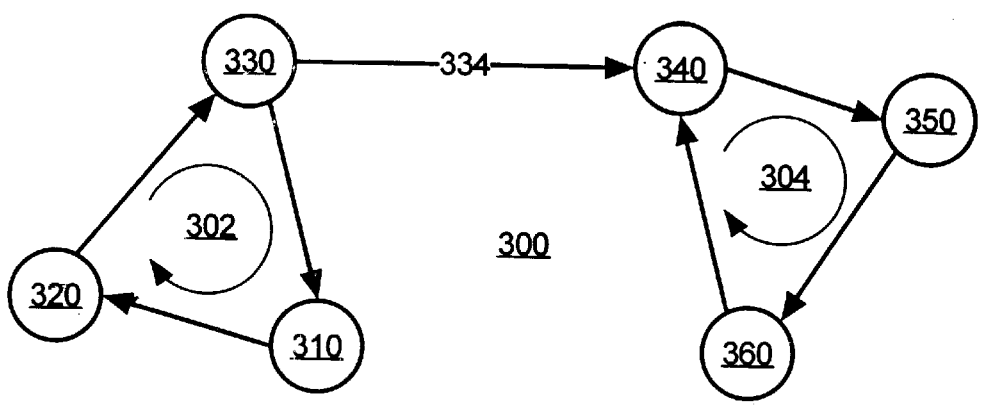
FIG. 3 is a schematic drawing of an adaptive integration network with mutually interacting, separated loops in accordance with one embodiment of the present invention.

As another example, one loop could branch off an active pathway to another loop, thereby initiating activity in the other loop. FIG. 3 depicts a portion of an adaptive integration network 300 with two loops 302 and 304. Loop 302 comprises three neurons 310, 320, and 330 connected in sequence, and loop 304 comprises three neurons 340, 350, and 360 connected in sequence. Furthermore, loop 302 is connected to loop 304 by a connection 334 from neuron 330 of loop 302 to neuron 340 of loop 304. Activity in loop 302, eventually results in the firing of neuron 330, which sustains the activity of loop 302 by transmitting an output signal to neuron 310 of loop 302 and initiates activity in loop 304 by transmitting the output signal via connection 334 to neuron 340 of loop 304.

Since an adaptive integration network provides much flexibility in configuration, it is to be understood that the present invention is not limited to any particular configuration of neurons and connections. Preferably, it is desirable to choose the number, distribution, and types of connections to maximize the total number of feedback loops while minimizing the functional constraints and interdependence of the loops. In general, this goal can be met by employing as many connections per node as feasible for a given implementation.

The distribution of connections can vary from implementation to implementation of an adaptive integration network. For example, connections can be limited by a maximal length so that distant neurons cannot be directly connected, and the assignment of connections can be determined randomly or in accordance with an algorithm designed to give each neuron a similar physical or logical arrangement.

For the proportion of the excitatory and inhibitory connections, it is desirable to choose the number of inhibitory connections such as by maximizing the product of the number of inhibitory connections and the number of feedback loops with excitatory connections that still can be formed. In one embodiment, the number of inhibitory connections $I_{opt}$ in an adaptive integration network is chosen in accordance with the following formula:

$$I_{opt} = \frac{nk}{L(n,k)+1}, \qquad (1)$$

where n represents the number of neurons in the adaptive integration network, k represents the number of connections per neuron, and L(n, k) is a function that indicates the expected average loop length (number of connections per loop), calculated, for example, according to the following equation:

$$L(n, k) = \sum_{l=1}^{n} P(l, n)\left(\frac{k}{n}\right)^{l} / \sum_{l=1}^{n} \frac{1}{l} P(l, n)\left(\frac{k}{n}\right)^{l}, \quad (2)$$

where $P(l, n)=n!(n-l)!$ is the permutation function giving the number of neuron in all loops of length l that can be made from n neuron, k/n is the expected number of connections from one neuron to another, and 1/l is a factor that converts the number of neuron in loops of length l into the number of loops of length l.

NEURON FIRING

In an adaptive integration network, a neuron fires in response to firings of the neuron's presynaptic neurons under certain conditions. More specifically, each neuron has an associated excitation level $\epsilon$, which is responsive to the signals received from the neuron's presynaptic neurons. The neuron fires when the neuron's excitation level $\epsilon$ is greater than or equal to the neuron's threshold value $\theta$.

Furthermore, each connection is characterized by a corresponding synaptic efficiency in transferring its signal, represented by a connection weight $w_i$, where i indicates the ith connection for the neuron. The value received from a presynaptic neuron is a function of the firing state signal $x_i$ and the connection weight $w_i$, preferably as a product $x_i w_i$. Excitatory connections have positive connection weights, and inhibitory connections have negative connection weights.

Whenever a presynaptic neuron i fires a signal to its postsynaptic neurons, the firing neuron causes the excitation level $\epsilon$ of the postsynaptic neurons to change by the weighted signal value $\Sigma w_i w_i$. From a discrete time perspective (useful in software implementations), the excitation level $\epsilon$ at time t can be updated to excitation level $\epsilon'$ for time t+1 according to the formula:

$$\epsilon' = \epsilon + \Sigma x_i w_i, \quad (3)$$

where $\epsilon'$ is the new excitation level of the postsynaptic neuron, $x_i$ is the firing state at time t of the ith presynaptic neuron, $w_i$ is the connection weight of the connection from the ith presynaptic neuron, and the quantity $x_i w_i$ is summed at time t for all presynaptic neurons.

After firing, the neuron's excitation level $\epsilon$ is reset to a base level, for example, to zero in the next time period. If the neuron does not fire, on the other hand, the neuron's excitation level $\epsilon$ is preserved, so that the excitation level $\epsilon$ may accumulate over time and the neuron may eventually fire. In one embodiment, however, the excitation level $\epsilon$ is subject to a decay process, for example, by multiplying the current excitation level by an attenuation parameter in the range $0.0 \leq \alpha \leq 1.0$. In this embodiment, the discrete time interval update formula therefore becomes:

$$\epsilon' = \alpha\epsilon + \Sigma x_i w_i. \quad (4)$$

In one embodiment, neurons may be subject to a refractory period in which the neuron s excitation level $\epsilon$ is forced to remain at the basal level for a given period of time. During the refractory period, the activity of its presynaptic neurons does not affect the neuron's excitation level $\epsilon$. Consequently, the refractory period servers to impose a limit on the maximum firing rate of the neuron.

Referring back to FIG. 1, the firing of neuron 130 is illustrated in a working example that assumes that the connection weight $w_{123}$ for connection 123 (from presynaptic neuron 120) is 0.5, the current excitation level $\epsilon_{130}$ of neuron 130 is 0.1, and the threshold level $\theta_{130}$ is 0.7. When neuron 120 fires, neuron 120 produces an output signal $x_{123}=1.0$ that is transmitted to neuron 130. With a connection weight $w_{123}=0.5$, the excitation level $\epsilon'_{130}$ of neuron 130 becomes 0.1+0.5=0.6. Since the excitation level $\epsilon_{130}=0.6$ is less than the threshold level $\theta_{130}=0.7$, the neuron 130 does not fire.

If neuron 120 fires again when the excitation level $\epsilon_{130}$ is 0.6 (assuming no attenuation), the excitation level $\epsilon'_{130}$ of neuron 130 is increased by 0.5 again, but this time to $\epsilon_{130}=0.6+0.5=11$. Since the excitation level $\epsilon'_{130}=11$ is now great threshold level $\theta_{130}=0.7$, neuron 130 now fires, thereby transmitting a signal to postsynaptic neurons 140 (in an inhibitory connection 134) and 160 (in an excitatory connection 136). On the other hand, if the connection weight $w_{123}$ for connection 123 is sufficiently high, for example, above the threshold level, then a firing of neuron 120 will always cause neuron 130 to fire in the next time period.

TRAINING

Training is the process of updating the connection weights in an adaptive integration network so that the adaptive integration network produces desired outputs in response to inputs. In contrast with prior techniques involving artificial neural networks that employ distinct training and implementation phases, training the adaptive integration network is constantly occurring during the normal operation of the adaptive integration network.

Prior to operation of the adaptive integration network, the connection weights within the adaptive integration network are initialized, for example, either randomly or to a preset value. During the operation of the adaptive integration network, the connection weights are constantly strengthened or weakened, provided that the connection weight strengthening or weakening conditions are met.

CONNECTION WEIGHT STRENGTHENING

Connection weight strengthening refers to the process of increasing the absolute value of the connection weight; that is, an excitatory connection weight becomes more positive and an inhibitory connection weight becomes more negative. Connection weight strengthening occurs whenever any two connected neurons fire in close temporal proximity with the presynaptic neuron firing before the postsynaptic neuron. For continuous time embodiments (e.g. asynchronous hardware implementations), close temporal proximity may be substantially simultaneous, and in discrete time embodiment (e.g. software or synchronous hardware implementations), close temporal proximity refers to firings within the same or adjacent discrete time interval.

Optionally in some implementations, connection weight strengthening occurs every time a neuron fires, but the magnitude of the connection weight strengthening is a function of amount of time since the presynaptic neuron of the connection has fired. For example, this function could be a decreasing exponential decay function, such as $e^{-\Delta t}$, where $\Delta t$ is the amount of time since the presynaptic neuron of the connection has fired.

Figure 4:
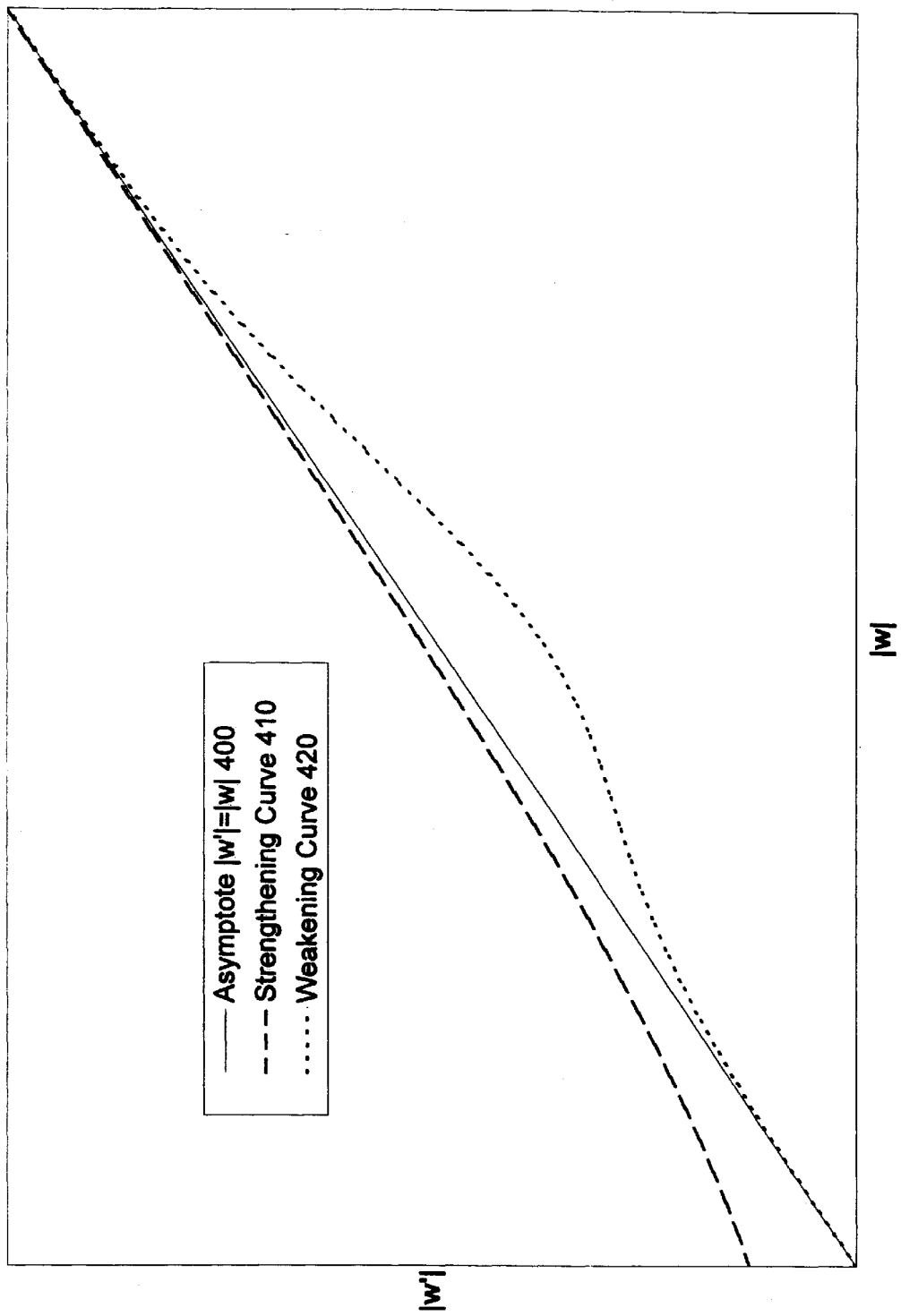
FIG. 4 is a graph illustrating exemplary connection weight strengthening and connection weight weakening curves in accordance with one embodiment of the present invention.

Under conditions of connection weight strengthening, the absolute value of the connection weight is increased by some amount, for example, a specified constant amount or by an amount that is dependent on the current value of the connection weight. Preferably, a connection weight strengthening function is employed to produce progressively smaller increases for larger absolute values of connection weight. In other words, large increases in the connection weight are made to relatively small absolute values of connection weights, but smaller increases are made to relatively absolute values of connection weights. For example, a weight strengthening function may be employed that asymptotically approaches the line w'=w for greater absolute values of w, such as exponentially in the following function:

$$w' = w + \frac{1}{Ae^{Bw}}, \tag{5}$$

where A and B are any non-zero real numbers. FIG. 4 is a graph showing the shape of such a weight strengthening curve 410 in relation to an asymptote w'=w 400.

In the previous working example, illustrated with reference to FIG. 1, assume that neuron 130 has an excitation level $\epsilon_{130}$=0.6 and a connection weight $w_{123}$=0.5 for connection 123. When neuron 120 fires, the excitation level of neuron 130 is increased by 0.5 to $\epsilon_{130}$=0.6+0.5=1.1, which is greater than the threshold level of $\theta_{130}$=0.7, there causing neuron 130 to fire. In this example, neuron 120 and neuron 130 have fired in close temporal proximity, causing the connection weight for connection 123 to be strengthened. Using equation (5) with constants A=8 and B=4, the new connection weight becomes $w_{123}$=0.52. If the connection weight had originally been 0.100, for example, the result would have become 0.180, and if the connection had been 0.900, the result would have been only 0.903.

Thus, the asymptotic connection weight strengthening curve 410 has at least two desirable properties. First, smaller connection weights are increased rapidly, thereby allowing the adaptive integration network 100 to quickly respond to changes in stimuli. Second, larger connection weights become mostly fixed, thereby preventing runaway connection weight values.

In alternative embodiments, other connection weight strengthening curves can be employed to achieve one or both of the aforementioned desirable properties. For example, imposing a maximum weight cap, beyond which weights are not allowed to be strengthened would also prevent runaway connection weights.

Connection weight strengthening allows for frequently used neuronal pathways to be reinforced. As one neuron fires, the neuron produces an output signal that may induce one or more of the neuron's postsynaptic neurons to fire in close temporal proximity, thereby strengthening the connection between the neurons. Similarly, the firing of the postsynaptic neuron may cause that neuron's postsynaptic neuron to fire, creating a chain reaction of firing neurons along an active pathway. Since a connection weight increases when both the presynaptic and the postsynaptic neurons fire in close temporal proximity, each time the active neural pathway is used, the connection weights along the active pathway are increased.

A loop is a special case of a frequently used active pathway, because, once initiated, the neurons in the loop successively fire in cycles around the loop. Each time the neurons fire, their connections are strengthened, yielding a stable loop circuit. Consequently, the connection weight strengthening rules foster stable circuits of self-reinforcing loops, which can constitute stored memory of patterns and other information.

CONNECTION WEIGHT WEAKENING

Connection weight weakening refers to the process of decreasing the absolute value of the connection weight; that is, an excitatory connection weight becomes less positive and an inhibitory connection weight becomes less negative. Connection weight weakening occurs after a specified period of passivity for the connection. A connection is considered "passive" for particular point in time if the postsynaptic neuron and the presynaptic neuron of the connection have not fired in close temporal proximity in that period of time. Thus, the connection weights for passive connections progressively weaken, reducing the influence of those passive connections in the adaptive integration network.

Under conditions of connection weight weakening, the absolute value of the connection weight is decreased by some amount, for example, a specified constant amount or by an amount that is dependent on the current value of the connection weight, but not beyond zero. Preferably, a connection weight weakening function is employed to produce progressively smaller decreases for both smaller and larger absolute values of the connection weight, while allowing for mid-ranged connection weights to be lowered at a greater decrement. For example, a connection weight weakening function can be used that asymptotically approaches the line w'=w for greater extreme absolute values of w, such as in accordance with a Gaussian curve as in the following function:

$$w'=w-e^{-((w-A)^2/C)}, \tag{6}$$

where A, B, and C are real numbers. Reference is made again to the graph in FIG. 4, showing the shape of such a weight weakening curve 420 in relation to an asymptote 400. In the example of neuron 130 of FIG. 1, after much passivity of neuron 130, the connection weight for connection 123 would be weakened. For A=0.5, B=5, and C=8, a connection weight of 0.500 would be heavily weakened to 0.375, but connection weights of 0.900 and 0.100 are only slightly weakened to 0.898 and 0.098, respectively.

The double asymptotic connection weight weakening curve 420 has at least two desirable properties, particularly in combination with the single asymptotic weight strengthening curve 410. First, smaller connection weights are prevented from sinking too low, thereby preventing runaway connection weight values near zero. Since the weight strengthening also slows down for larger weights, the combination of the connection weight weakening curve 420 and the single asymptotic weight strengthening curve 410 serves to achieve a normalizing effect.

Second, larger connection weights are slowly decreased, thereby allowing for strong connections to remain more or less fixed, slow to decay even after prolonged passivity. This effect can also be achieved in an alternative embodiment by imposing a minimum connection weight cap, beyond which the absolute value of the connection cannot be decreased.

ADAPTIVE LEARNING

In an adaptive integration network, connection weights are constantly being adjusted during normal operation, for example, strengthened when two connected neurons fire in close temporal proximity or weakened after a period of passivity. Therefore, even mere use of the adaptive integration network causes the adaptive integration network to be fine-tuned.

Figure 5:
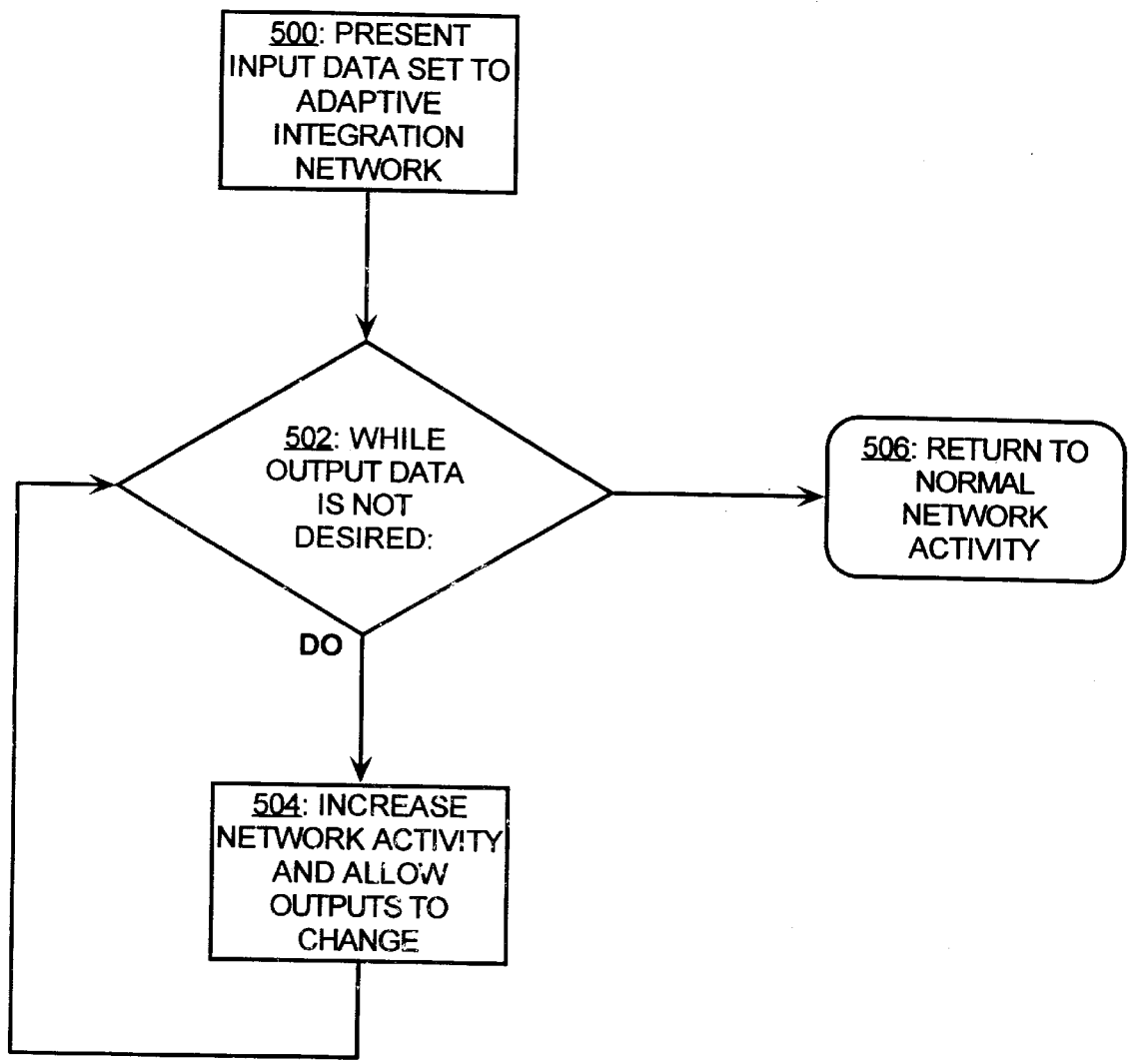
FIG. 5 is flowchart illustrating the operation of adaptive learning in accordance with one embodiment of the present invention.

In certain cases, however, it is desirable to cause the adaptive integration network to learn and adapt to new patterns and information. In accordance with one aspect of the invention, as illustrated in FIG. 5, adaptive learning is fostered by presenting input data to the adaptive integration network (step 500). The input data causes neuron firings, leading to output data from output data neurons as the result. In a loop controlled by step 502, as long as the output data does not match the desired output, the network activity of the adaptive integration network is increased (step 504), which causes the output data to change as explained in more detail herein after. When the desired data is produced, the network activity is restored to the normal level (step 506). Various techniques may be employed to increase network activity, i. e. the rate of neural firings, including threshold lowering, connection weight augmentation, and output signal magnification.

In one embodiment, network activity is increased by lowering the thresholds of the neurons in the adaptive integration network. For example, the thresholds could be reduced by a fixed amount or proportion, such as to one half. Threshold lowering causes neurons to fire sooner, because the excitation level $\epsilon$ only needs to reach a lower threshold level. Consequently, firing rate of neurons in the adaptive integration network is increased and, hence, in the network activity of the adaptive integration network.

Another way to increase network activity is to scale the connection weights of the neurons in the adaptive integration network by a positive factor. Each time a neuron fires, the excitation level $\epsilon$ of the postsynaptic neurons are increased by a much larger amount because the connection weight $w_i$ is scaled larger. Consequently, the threshold level of the neuron is reached much more rapidly, increasing the firing rate of neurons in the adaptive integration network and, hence, the network activity.

Yet another way to increase network activity is to increase the magnitude of the neural signals. Each time a neuron fires, the excitation level $\epsilon$ of the postsynaptic neurons are increased by a much larger amount because the neural output signal $x_i$ is larger. Consequently, the threshold level of the neuron is reached much more rapidly, increasing the firing rate of neurons in the adaptive integration network and, hence, the network activity.

In a related embodiment, network activity is increased by augmenting external input signals for selected data input neurons to be at values above 1.0. This feature, which is useful when the output signal $x_i$ of a neuron is defined to be 0.0 if the neuron is not firing and greater than or equal to 1.0 according to a function of the excitation level $\epsilon$ if the neuron is firing. For example, the range of the function could start from 1.0 at excitation level $\epsilon$=threshold level $\theta$ and asymptotically approaches the excitation level $\epsilon$ for larger differences of $\epsilon-\theta$, e.g. according to an exponential curve such as $\epsilon-(\epsilon-1)e^{-(\epsilon-\theta)}$. One advantage of this related embodiment is that distinct sets of data input neurons that are not correlated with other data input neurons can be individually trained by augmenting the external input signal only for particular sets of data input neurons.

Increasing network activity enables for new active pathways to be explored. For example, a neuron that is adjacent to an active pathway, but not part of the active pathway, might not ordinarily fire because it has a low connection weight for a connection to a neuron on the active pathway. In this case, the excitation level $\epsilon$ of the neuron does not sufficiently accumulate to the ordinary threshold level to fire, for example, due to a more rapid attenuation of the excitation level $\epsilon$ or to competing inhibitory inputs. A lowered threshold, however, may be low enough or the excitation level $\epsilon$ may accumulate rapidly enough to induce that neuron to fire, enabling a new active pathway to be branched off the main active pathway.

Alternatively, an increased weighted signal (with a temporarily stronger connection, more powerful input signal, or both) causes the excitation level $\epsilon$ to rise to a higher level, above the threshold level. In addition, that neuron's connection to the active pathway is strengthened, because the neuron was induced to fire in close temporal proximity to its presynaptic neuron.

Increasing network activity can also cause an active pathway for one stable circuit to transform into an active pathway for another stable circuit. A stable circuit, which constitutes stored memory, information, or patterns within the adaptive integration network, represent a locally optimal position in the solution space (all possible outputs for all possible input). As a result, increasing network activity permits adaptive exploration through the solution space in search of other locally optimal positions for the new input/output data sets. Another result of increasing network activity is that the response time of the adaptive integration network is reduced, making the adaptive integration network faster.

Figure 6A:
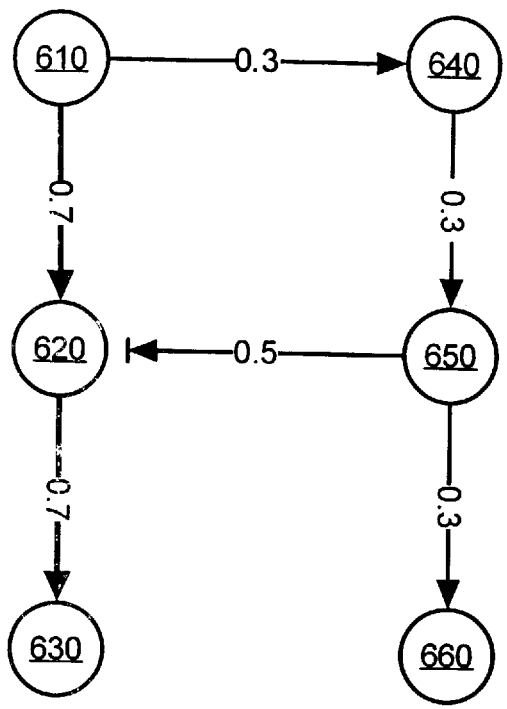
FIGS. 6A and 6B are before and after schematic drawings of an exemplary adaptive integration network for illustrating how an active pathway is dislodged in accordance with one embodiment of the present invention.
Figure 6B:
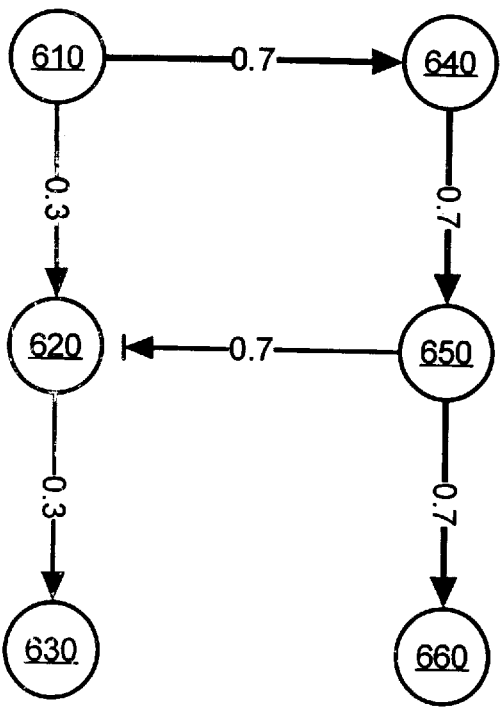

FIGS. 6A and 6B illustrate how increasing network activity can dismantle an active pathway. In FIG. 6A, an active pathway comprises neurons 610, 620, and 630 with high connection weights of 0.7. The pathway that includes neurons 640, 650, and 660 with low connection weights of 0.3, on the other hand, is inactive. Furthermore, the low connection weight of 0.3 for the connection between neuron 610 of the active pathway and neuron 640 means that neuron 640 rarely fires, because the connection weight is too low to cause the excitation level $\epsilon_{640}$ of neuron 640 to sufficiently increase to reach the ordinary threshold level.

When network activity is increased, for example by lowering the threshold, the accumulated excitation level $\epsilon_{640}$ is now high enough with respect to the lowered threshold to cause neuron 640 to fire in response to a firing of neuron 610. When neuron 640 fires, an output signal is transmitted to the neuron 650, which also fires with the increased network activity. The firing of neuron 650 induces neuron 660 to fire and therefore strengthen their connection. Neuron 650, moreover, is the source of an inhibitory connection to neuron 620 of the active pathway, which prevents neuron 620 from firing so often. As both neuron 650 and neuron 620 fire, the inhibitory connection between the two neurons is strengthened, further preventing neuron 620 from firing so often. Eventually, the passivity of neuron 620 causes the connection between neuron 610 and 620 to weaken, completing the dislodging of the active pathway.

FIG. 6B illustrates the result of dislodging the active pathway, in which the new active pathway comprises neurons 610, 640, 650, and 660. Neurons 620 and 630 were formerly part of an active pathway, but are no longer, because their connection weights have been weakened.

Adaptive learning can be initiated in response to an external signal from a user when the output is wrong, which is analogous to a biological pain signal. This external signal causes the network activity to be increased, for example, by lowering the threshold levels of the neurons. The increased network activity causes the input signals to be deflected or rerouted onto new active pathways and loops, thereby exploring new stable circuits.

These new pathways and loops will eventually affect the data output neurons and alter the output values. If the output values are still undesired, then the increase in the network activity is maintained, causing the new pathways and loops to be ephemeral and generating even newer active pathways and loops. As soon as the desired output is reached, the user will discontinue the network activity increasing signal, causing the relevant network parameters (thresholds, etc.) to rebound to their ordinary levels and ceasing the adaptive training. This process can be automated if the desired output is presented before hand so that the output of the adaptive integration network can be compared by computer with the desired output to generate the external signal.

In contrast with retraining methods for conventional artificial neural networks, adaptive learning with adaptive integration networks is less disruptive. For example, with conventional artificial neural networks every neuron is perturbed during training, but with adaptive integration networks only the neurons along active pathways and their neighbors are affected. Thus, only relevant connections are adjusted, and previously established but unrelated loops and metaloops are left intact, which hold previously learned classifications and information. Therefore, in further contrast with conventional artificial neural networks, adaptive integration networks can learn new information and patterns at any time without having to relearn previously learned material or going through a new training stage.

HARDWARE AND SOFTWARE IMPLEMENTATIONS

Figure 7:
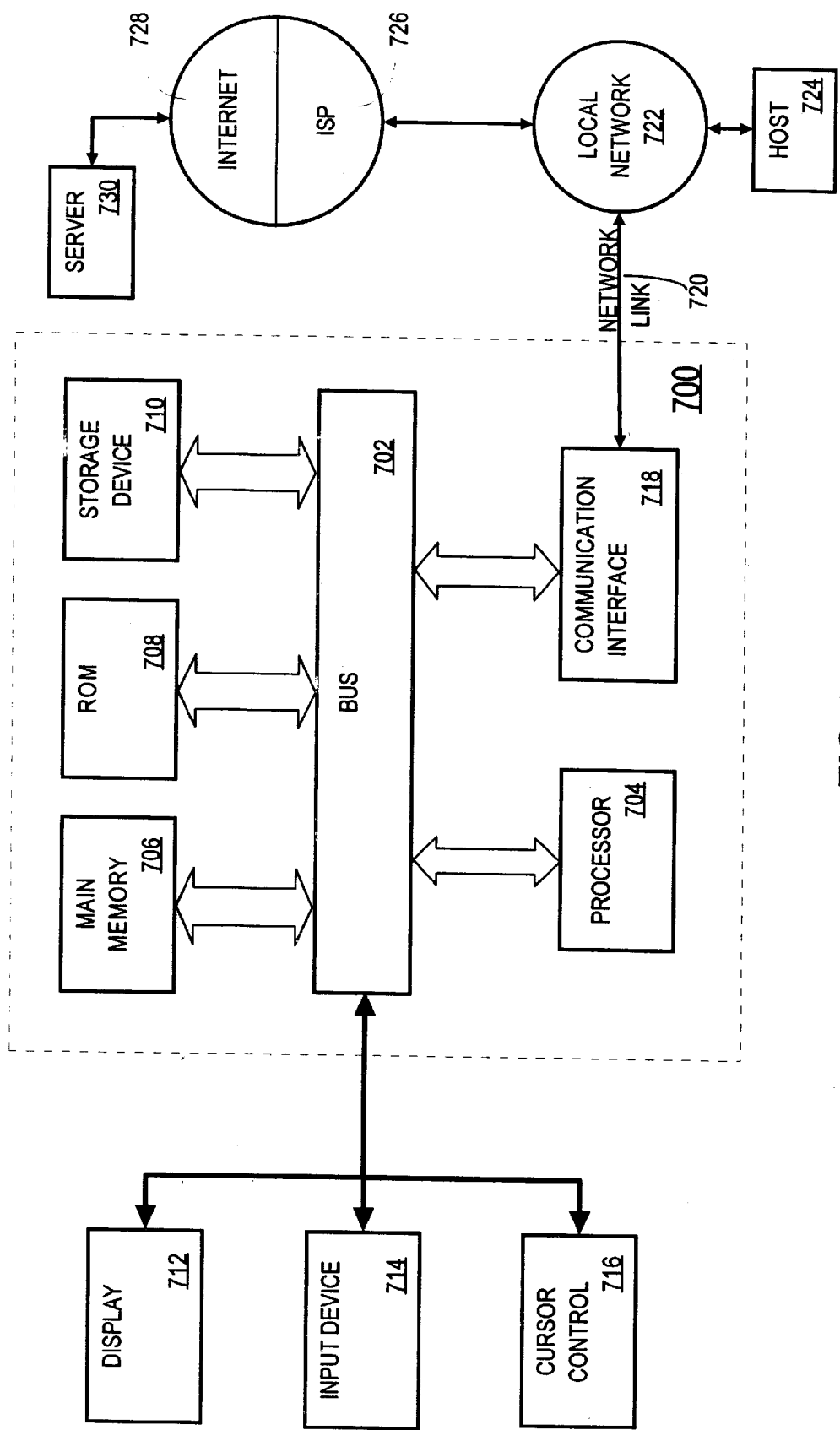
FIG. 7 depicts a computer system that can be used to implement an embodiment of the present invention.

Embodiments of the invention can be implemented in software or more directly in hardware. FIG. 7 is a block diagram that illustrates a computer system 706 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary. variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing adaptive integration networks. According to one embodiment of the invention, implementing adaptive integration networks is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media include, for example, optical or magnetic disks, such as storage device 710. Volatile media include dynamic memory, such as main memory 706. Transmission media include coaxial cables, copper wire and fiber optics, including the wires that comprise bus 702. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be borne on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network, now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720, and communication interface 718. In the Internet example, a server 730 might transmit a requested code for an application program through Internet 728, ISP 726, local network 722 and communication interface 718. In accordance with the invention, one such downloaded application provides for implementing adaptive integration networks as described herein. The received code may be executed by processor 704 as it is received, and/or stored in storage device 710, or other non-volatile storage for later execution. In this manner, computer system 700 may obtain application code in the form of a carrier wave.

Figure 8:
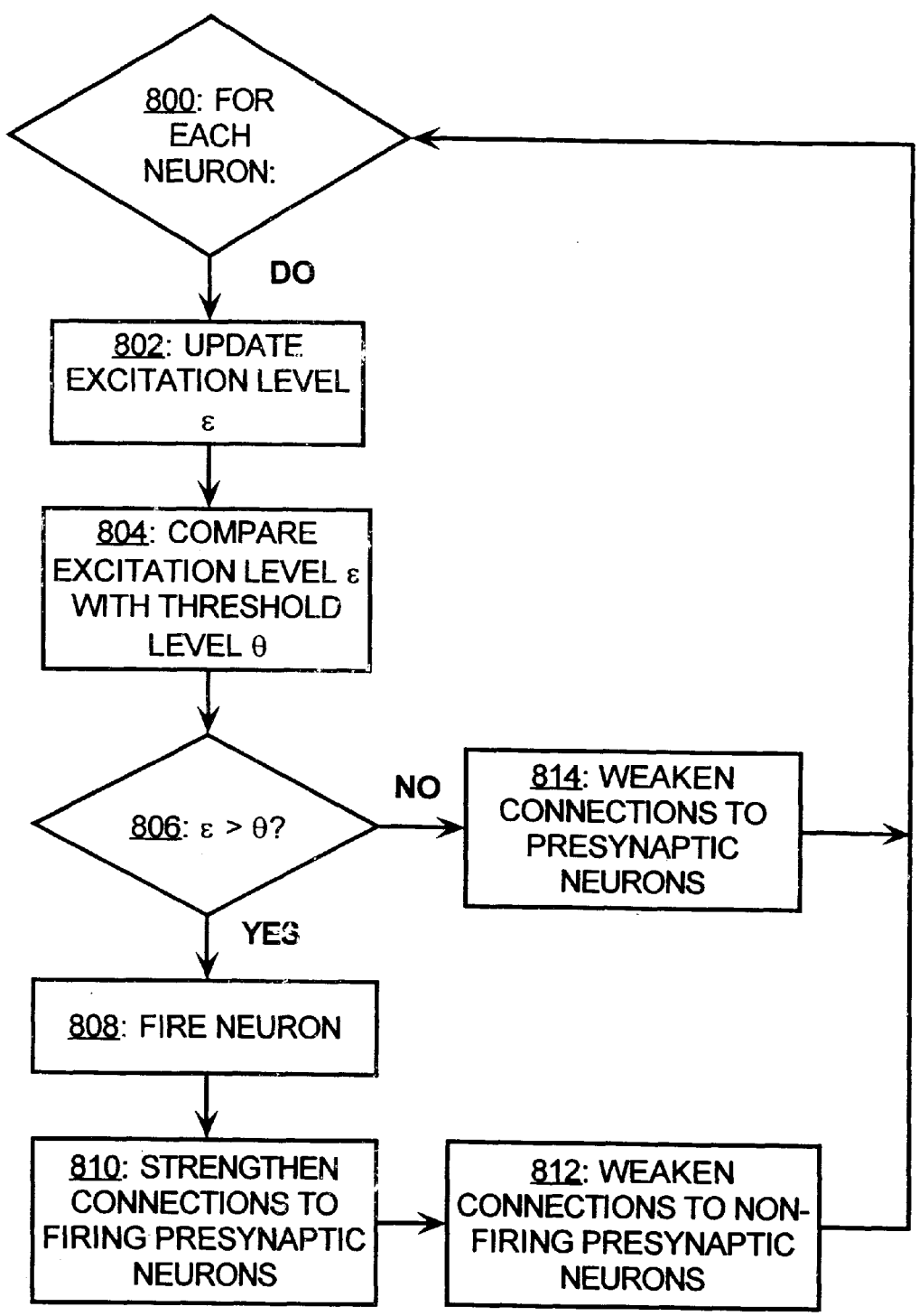
FIG. 8 is a flowchart illustrating the operation of a software embodiment of the present invention.

FIG. 8 is a flowchart illustrating the operation of an embodiment of the present invention, for example, in a software implementation. Step 800 controls a main loop that processes each neuron in the adaptive integration network for each time period.

At step 802, the excitation level $\epsilon$ of each neuron is updated based on a weighted product of the input signals to the neuron received from its presynaptic neurons. In addition, the current excitation level $\epsilon$ may undergo attenuation as by applying equation (4) described herein above.

At step 804 the excitation level $\epsilon$ is compared with the current threshold value $\theta$. If the excitation level $\epsilon$ is greater than or equal to the current threshold value $\theta$ at step 806, then execution proceeds to step 808. If, on the other hand, the excitation level $\epsilon$ does not exceed the current threshold value $\theta$ at step 806, then execution branches to step 812.

At step 808, which occurs if the excitation level $\epsilon$ is greater than or equal to the current threshold value $\theta$, the neuron fires, generating an output signal, and the excitation level $\epsilon$ is reset to a base value, such as zero. At step 810, the presynaptic neurons are checked to determine if the presynaptic neurons have fired in close temporal proximity, and, if so, their connection weights are strengthened, as by applying equation (5) described herein above. At step 812, the connection weights of non-firing presynaptic neurons are weakened, as by applying equation (6) described herein above. Execution then loops back to step 800 where another neuron is processed.

At step 814, which occurs on the other hand if the excitation level $\epsilon$ does not the current threshold value $\theta$, the neuron does not fire, and the weight weakening conditions are checked to determined if the connection weights should be weakened, e.g. after some period of passivity. For example, if the neuron does not fire, then all connections to presynaptic neurons are weakened, as by applying equation (6) described herein above. Execution then loops back to step 800 where another neuron is processed.

Network activity may be temporarily increased in this embodiment by lowering the threshold level $\theta$, scaling the connections weights $w_i$ by a positive factor, or increasing the magnitude of the input signals $x_i$.

Figure 9:
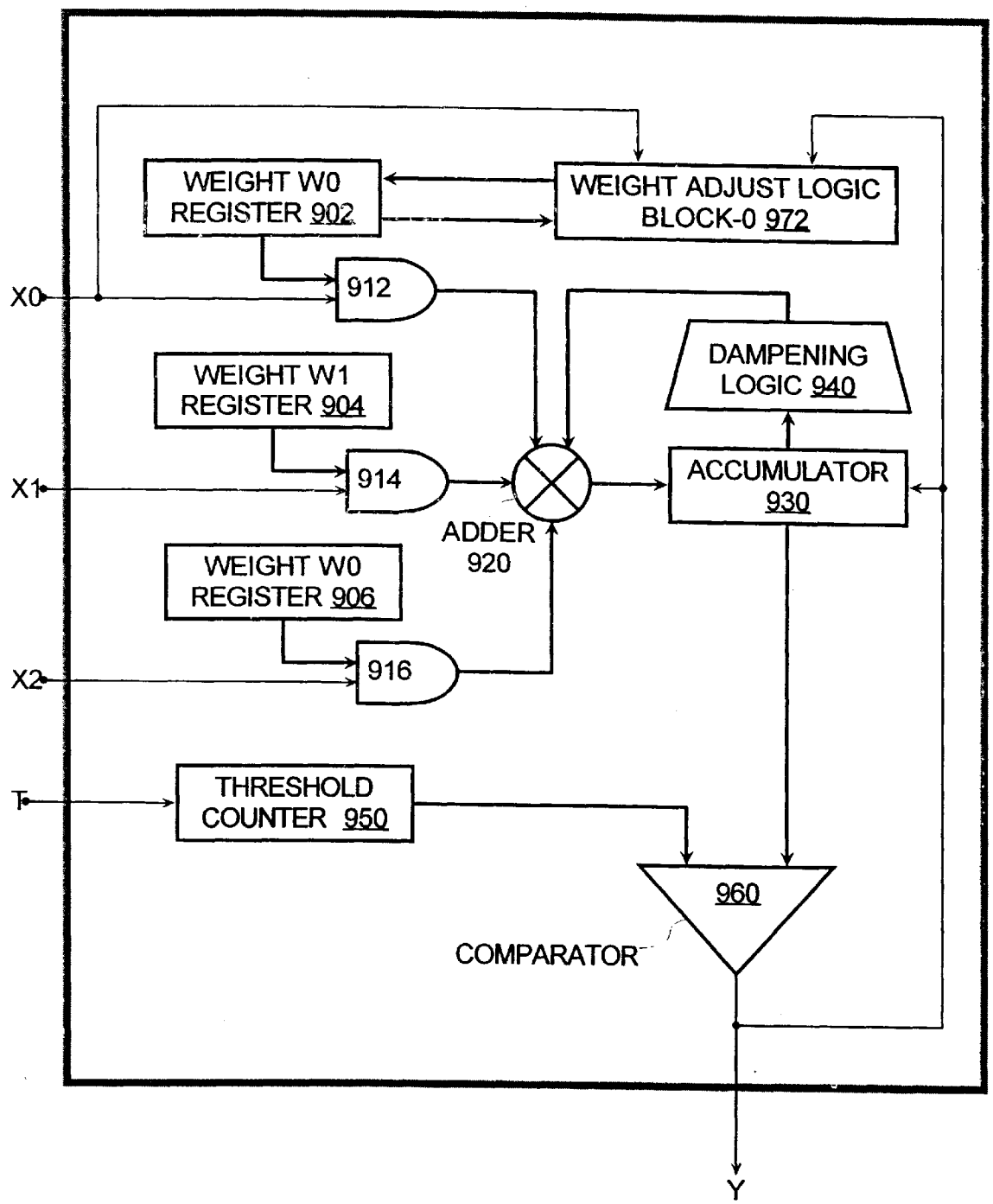
FIG. 9 is a schematic diagram of a neuron in a hardware embodiment of the present invention.
Figure 10A:
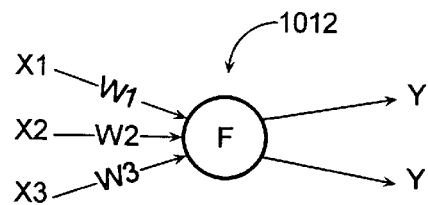
FIG. 10A depicts a conventional artificial neuron.
Figure 10B:
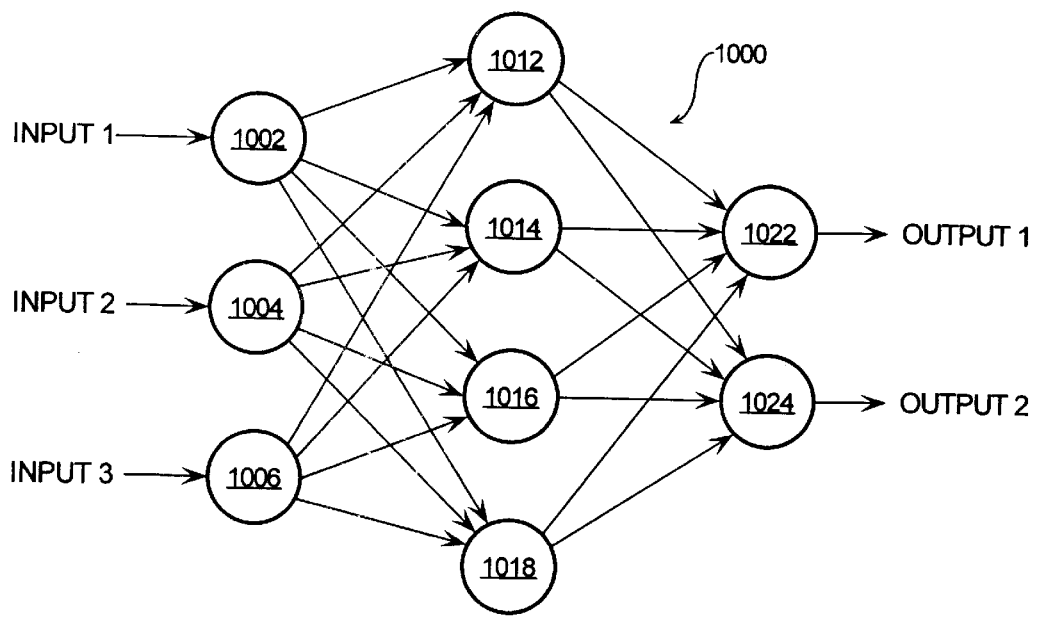
FIG. 10B depicts a conventional artificial neural network.

FIG. 9 is a schematic diagram of a digital logic hardware implementation of a neuron 900 in accordance with one embodiment of the present invention. Although neuron 900 is shown as configured with only three inputs X0, X1, X2 from corresponding connections, additional inputs and connections may be readily implemented by repeating the logic circuits. Neuron 900 comprises a corresponding number of registers 902, 904, and 906 for outputting an N-bit (e.g. 8 bit) weight value associated with the corresponding connections. Alternatively, weight registers 902, 904, and 906 may be implemented by memory cells in a random access memory.

Also associated with each connection is a corresponding AND gate 912, 914, and 916 for selectively outputting the N-bit connection weight from corresponding weight registers 902, 904, and 906 if the corresponding input X0, X1, and X2 is a logical high or outputting an N-bit zero if the corresponding input X0, X1, and X2 is a logical low.

The output of AND gates 912, 914, and 916 is applied to an N-bit adder 920 for adding the weighted connection values to produce a sum that is stored in an N-bit accumulator 930 for holding the current excitation level. In addition, the current excitation level stored in accumulator 930 is applied to damping logic 940 for reducing the current excitation level and is then fed back into the adder 920. Preferably the dampening logic is configured to attenuate the current excitation level by subtracting a fraction that is a power of 2, such as one-fourth or one-eighth.

The output of N-bit accumulator 930 is also applied to a comparator 960, which is configured to compare the output of N-bit accumulator 930 (i.e., the current excitation level) with the value in an N-bit threshold counter 950 to produce a logical high if the N-bit accumulator 930 value is greater than or equal to the N-bit threshold counter 950 value or a logical low if the N-bit accumulator 930 value does not the N-bit threshold counter 950 value.

The result of the comparator 960 is fed back to reset accumulator 930 to a base level (e.g. an N-bit zero) and to weight adjust logic blocks 972, 974 (not shown), and 976 (not shown) that correspond to the weight registers 902, 904, and 906. The weight adjust logic block 972 is configured for strengthening and/or weakening the value in the corresponding weight register 902 if the connection weight strengthening and weakening conditions have been met. If the conditions are met, the weight adjust logic block 972 outputs the appropriate value (determined by lookup tables or by special-purpose digital logic).

In embodiments where network activity is increased by lowering the threshold value, an input T is provided for threshold counter 950 to count up or down to a desired level. Alternatively, threshold counter 950 may implemented by a shift register to increase or decrease the threshold value by multiples of 2. In embodiments where network activity is increased by increasing the connection weights or scaling the connection weights by a positive factor, then the weight registers 902, 904, and 906 could be implemented by counters or shift registers (not shown) responsive to the signal T.

In an alternative implementation, analog circuitry may be employed. For example, the excitation level $\epsilon$ for each neuron may be stored as an accumulated charge in a capacitor, and appropriate arrangements of operational amplifiers, capacitors, and resistors may be used to simulate the various exponential function disclosed herein.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of training a neural network, comprising:
presenting an input data set to the neural network to produce an output; and
increasing a number of firing neurons in the neural network until the output changes to a desired output.

2. The method according to claim 1, wherein:
the neural network includes a plurality of neurons interconnected by connections for transferring signals, each of said connections being associated with a weight; and
said increasing the network activity includes scaling the weight associated with the connections by a positive factor.

3. The method according to claim 1, wherein:
the neural network includes a plurality of neurons interconnected by connections for transferring signals having a magnitude in a firing state; and
said increasing the network activity includes increasing the magnitude of the signal in the firing state.

4. The method according to claim 1, wherein:
the neural network includes a plurality of interconnected neurons, said interconnected neurons including a plurality of data input neurons adapted to receive respective external signals; and
said increasing the network activity includes increasing a magnitude of the external signals.

5. The method according to claim 1, wherein:
the neural network includes a plurality of interconnected neurons, each of said interconnected neurons being configured to fire when a corresponding excitation level thereof is greater than or equal to a threshold; and
said increasing the network activity includes lowering the threshold.

6. The method according to claim 5, further comprising:
determining the excitation level of one of the neurons based on a weighted sum of input signals received over respective connections, said connections being associated with respective weights; and
adjusting each of the weights when said one of the neurons and a corresponding one of the others of the neurons fire within a prescribed time interval.

7. The method according to claim 6, wherein said adjusting includes adjusting said each of the weights to asymptotically converge to a line w'=w for higher absolute values of the weight.

8. The method according to claim 1, further comprising increasing the network activity in response to a signal.

9. The method according to claim 8, further comprising:
providing the desired output data; and
comparing the desired output data and the output to generate the signal in response if the desired output data is not equal to the output.

10. A neural network comprising:
means for receiving an input data set;
means for producing an output based on the input data set; and
means for increasing a number of firing neurons in the neural network until the output changes to a desired output.

11. The neural network according to claim 10, wherein:
the neural network includes a plurality of neurons interconnected by connections for transferring signals, each of said connections being associated with a weight; and
said means for increasing the network activity includes means for increasing the weight associated with the connections.

12. The neural network according to claim 10, wherein:
the neural network includes a plurality of neurons interconnected by connections for transferring a signal in a firing state having a magnitude; and
said means for increasing the network activity includes means for increasing the magnitude of the signal in the firing state.

13. The method according to claim 10, wherein:
the neural network includes a plurality of interconnected neurons, said interconnected neurons including a plurality of data input neurons adapted to receive respective external signals; and
said means for increasing the network activity includes means for increasing a magnitude of the external signals.

14. The neural network according to claim 10,
wherein the neural network includes a plurality of interconnected neurons, each of said interconnected neurons being configured to fire when a corresponding excitation level thereof is greater than or equal to a threshold; and
said means for increasing the network activity includes means for lowering the threshold.

15. The neural network according to claim 10, further comprising means for increasing the network activity in response to a signal.

16. The neural network according to claim 15, further comprising:
means for providing the desired output data; and
means for comparing the desired output data and the output to generate the signal in response if the desired output data is not equal to the output.

17. The neural network according to claim 10, further comprising:
a plurality of neurons; and
a plurality of excitatory and inhibitory connections interconnecting the neurons;
wherein some of the neurons are interconnected in a closed circuit of neurons linked by some of the excitatory connections in a same circular direction;
wherein the neurons of the closed circuit are configured to fire successively in cycles.

18. The neural network according to claim 17, wherein a number of the inhibitory connections $I_{opt}$ is approximately:

$$I_{opt} = \frac{nk}{L(n,k)+1},$$

wherein n represents a number of the neurons, k represents a number of connections per node, and L(n, k) is a function that indicates an expected average loop length.

19. A computer-readable medium bearing instructions for training a neural network, said instructions being arranged to cause one or more processors upon execution thereby to perform the steps of:
presenting an input data set to the neural network to produce an output; and
increasing a number of firing neurons in the neural network until the output changes to a desired output.

20. The computer-readable medium according to claim 19, wherein:

the neural network includes a plurality of neurons interconnected by connections for transferring signals, each of said connections being associated with a weight; and said increasing the network activity includes scaling the weight associated with the connections by a positive factor.

21. The computer-readable medium according to claim 19, wherein:

the neural network includes a plurality of neurons interconnected by connections for transferring signals having a magnitude in a firing state; and said increasing the network activity includes increasing the magnitude of the signal in the firing state.

22. The computer-readable medium according to claim 19, wherein:

the neural network includes a plurality of interconnected neurons, said interconnected neurons including a plurality of data input neurons adapted to receive respective external signals; and said increasing the network activity includes increasing a magnitude of the external signals.

23. The computer-readable medium according to claim 19, wherein:

the neural network includes a plurality of interconnected neurons, each of said interconnected neurons being configured to fire when a corresponding excitation level thereof is greater than or equal to a threshold; and said increasing the network activity includes lowering the threshold.

24. The computer-readable medium according to claim 23, wherein said instructions are further arranged to execute the steps of:

determining the excitation level of one of the neurons based on a weighted sum of input signals received over respective connections, said connections being associated with respective weights; and adjusting each of the weights when said one of the neurons and a corresponding one of the others of the neurons fire within a prescribed time interval.

25. The computer-readable medium according to claim 24, wherein said adjusting includes adjusting said each of the weights to asymptotically converge to a line w'=w for higher absolute values of the weight.

26. The computer-readable medium according to claim 19, wherein said instructions are further arranged to execute the step of increasing the network activity in response to a signal.

27. The computer-readable medium according to claim 26, wherein said instructions are further arranged to execute the steps of:

receiving the desired output data; and comparing the desired output data and the output to generate the signal in response if the desired output data is not equal to the output.

28. A method of operating a neural learning system including a plurality of interconnected neurons, said interconnected neurons configured to fire when respective excitation levels thereof are greater than or equal to respective thresholds, said method comprising the steps of:

operating the neural learning system to produce a first output in response to an input;

lowering the thresholds from the respective thresholds and operating the neural learning system with the lowered threshold; and restoring the thresholds to the respective thresholds, wherein further operation of the neural learning system after restoring the thresholds produces, in response to the input, a second output having a different value than the first output.

29. The method according to claim 28, further comprising the step of:

adjusting a weight associated with a connection between a pair of the interconnected neurons when the pair of interconnected neurons fired within a prescribed time interval.

30. A method of operating a neural learning system including a plurality of interconnected neurons, said interconnected neurons for transferring signals having a first magnitude in a firing state, said method comprising the steps of:

operating the neural learning system to produce a first output in response to an input;

increasing the magnitude in the firing state from the first magnitude to a second magnitude and operating the neural learning system with the increased magnitude in the firing state; and restoring the magnitude in the firing state to the first magnitude, wherein further operation of the neural learning system after restoring the magnitude in the first state, in response to the input, a second output having a different value than the first output.

* * * * *